United States Patent [19]
Brown et al.

[11] Patent Number: 5,783,092
[45] Date of Patent: Jul. 21, 1998

[54] WATER TREATMENT METHOD

[75] Inventors: Geoffrey A. Brown, Lithonia, Ga.; Mary L. Lines, Bermuda, Fla.; James J. Miller, Norcross, Ga.

[73] Assignee: Bio-Lab, Inc., Decatur, Ga.

[21] Appl. No.: 819,731

[22] Filed: Mar. 18, 1997

[51] Int. Cl.$^6$ ................................................ C02F 1/50
[52] U.S. Cl. .................. 210/759; 210/754; 210/755; 210/756; 210/764
[58] Field of Search .......................... 210/753, 754, 210/755, 756, 759, 758, 764

[56] References Cited

U.S. PATENT DOCUMENTS

| | | | |
|---|---|---|---|
| 3,867,286 | 2/1975 | Quinlan | 210/764 |
| 3,966,630 | 6/1976 | Quinlan | 210/700 |
| 4,239,622 | 12/1980 | Ridgway | 210/754 |
| 4,802,994 | 2/1989 | Mouche et al. | 210/759 |
| 4,975,109 | 12/1990 | Friedman, Jr. et al. | 210/755 |
| 5,015,395 | 5/1991 | Muia et al. | 210/755 |
| 5,096,601 | 3/1992 | Muia et al. | 210/755 |
| 5,192,451 | 3/1993 | Gill | 210/755 |
| 5,575,945 | 11/1996 | Perlman | 210/756 |

*Primary Examiner*—Neil McCarthy
*Attorney, Agent, or Firm*—Woodard, Emhardt, Naughton, Moriarty & McNett

[57] ABSTRACT

A method of treating water by adding to the water a shelf-stable composition of hydrogen peroxide and a polyquaternary ammonium compound, followed by intermittent treatment with chlorine-, bromine- or oxygen-releasing compounds.

3 Claims, 1 Drawing Sheet

WATER TREATMENT METHOD

FIELD OF THE INVENTION

The present invention relates generally to methods of treating water, and more particularly to a method of treating water with hydrogen peroxide, polyquaternary ammonium compounds and chlorine.

BACKGROUND TO THE INVENTION

It is well established that the water used in swimming pools, spas, hot tubs, cooling towers, etc., rapidly acquires a variety of microorganisms that may be harmful to human health. In addition, these microbes may damage the structural materials, equipment, etc., which contact the water, and may compromise industrial processes which use the water. Accordingly, biological fouling is a significant problem to the regulated water industry, resulting in much attention being paid to the development of agents to control microbial growth in aqueous milieu.

Biocides traditionally used to control microbial growth include chlorine, bromine, biguanide salts, peroxy compounds, ozone and quaternary ammonium compositions. Of these, chlorine has long been the dominant disinfectant, although the disadvantages of chlorine have led to a continued search for other disinfecting products. For example, although chlorine is highly effective it must be applied frequently to maintain its efficacy, and readily forms irritating chloramines and/or trihalomethanes. At high levels, chlorine can harm pool surfaces and equipment.

Although chlorine and bromine levels must be maintained at levels of 1-3 ppm (as $Cl_2$), periodic superchlorination is often required to assure microbiological control and adequate water quality. The environmental hazards associated with chlorine and the shortcomings associated with mechanical feeders underscores the need for a simplified, non-halogen alternative for water treatment.

As previously indicated, peroxy compounds are known to be effective sanitizers under certain conditions. One problem associated with the use of these compounds however, is that peroxides such as hydrogen peroxide are not effective as a stand alone sanitizers except when used at relatively high concentrations (e.g., 200 ppm or higher). Unfortunately, as the peroxide concentration increases so does the likelihood of injury or discomfort to swimmers and spa bathers.

When used in recreational waters, hydrogen peroxide suppliers usually treat their products with compounds such as phosphates in order to stabilize the concentrated solutions. However, these stabilizers are not designed to affect stability once the product has been applied to a body of water and diluted. Hence, an additional stabilizer is needed to protect and enhance the peroxide, post-application.

As to other sanitizers, polyquaternary ammonium compounds have been used in water treatment with some success. Monomeric quaternary ammonium compounds have also been used in water treatment, and generally are effective biocides. However, when monomeric quaternary ammonium compounds are used as primary sanitizers high concentrations (25-75 ppm) are necessary. Unlike polyquats, monomeric quats tend to produce substantial foam even at low concentrations (e.g., 5 ppm). Foaming will only be exacerbated at levels of 25 to 75 ppm.

When regulated waters are treated with $H_2O_2$, the system can only remain biocidally effective as long as $H_2O_2$ remains available for disinfection. If levels of organic materials accumulate, the half life of peroxide decreases with a corresponding decrease in antimicrobial efficacy.

It can be seen from the foregoing that a need continues to exist for methods of treating water with non-halogen sanitizers such as hydrogen peroxide and a polyquaternary ammonium compounds, with and without the additional use of chlorine. The present invention addresses this need.

SUMMARY OF THE INVENTION

Briefly describing the present invention there is provided a method of treating water by using strong oxidizing agents such as calcium hypochlorite, lithium hypochlorite, activated sodium bromide, sodium dichloroisocyanurate, trichloroisocyanurate, sodium hypochlorite, potassium peroxymonopersulfate, etc. to shock regulated waters treated with hydrogen peroxide ($H_2O_2$) and polyquaternary ammonium compounds (polyquats). Periodic superchlorination or superoxygenation can assist these regulated waters in maintaining acceptable water quality.

In another aspect of the invention there is provided a method of treating water by adding hydrogen peroxide and a polyquaternary ammonium compound to the water. The hydrogen peroxide and the polyquaternary ammonium compound are independently added to the water in amounts effective to maintain in the water a balanced sanitizing solution.

One object of the invention is to provide a method of enhancing the quality of regulated waters using polyquaternary amonium compounds, hydrogen peroxide and regular shocks with dry or liquid oxidizers.

Another object of the present invention is to provide an improved method of sanitizing water with dilute hydrogen peroxide.

Another object of the present invention is to provide a method of adding flocculent and clarifying properties to dilute hydrogen peroxide solutions.

Another object of the present invention is to provide a method of reducing the amount of hydrogen peroxide necessary to sanitize recreational waters.

Another object of the present invention is to provide a method of increasing the half-life of hydrogen peroxide used to sanitize recreational waters.

Further objects and advantages of the present invention will be apparent from the following description.

DESCRIPTION OF THE PREFERRED EMBODIMENT

For the purpose of promoting an understanding of the principles of the invention, reference will now be made to preferred embodiments and specific language will be used to describe the same. It will nevertheless be understood that no limitation of the scope of the invention is thereby intended, such alterations and further modifications in the preferred embodiments, and such further applications of the principles of the invention as described herein being contemplated as would normally occur to one skilled in the art to which the invention pertains.

In one preferred embodiment of the present invention strong oxidizing agents such as calcium hypochlorite, lithium hypochlorite, activated sodium bromide, sodium dichloroisocyanurate, trichloroisocyanurate, sodium hypochlorite, potassium peroxymonopersulfate, etc. are used to regenerate regulated waters treated with hydrogen peroxide ($H_2O_2$) and polyquaternary ammonium compounds (polyquats). The addition of these materials destroys organic materials and restores $H_2O_2$ half life to near its original level, effectively renewing the system to its original potency.

As to the specifics of the claimed method, only small amounts of unstabilized chlorine-, bromine- or oxygen-releasing compounds are needed. Moreover, the chlorine-, bromine- or oxygen-releasing compounds need only be applied on an intermittent basis in order to regenerate the water.

Preferably, a stable solution of $H_2O_2$ and a polyquat) or polyquats) is added to a body of water to give concentrations of $H_2O_2$ ranging from 1–100 ppm and a polyquat concentration ranging from 0.1–30 ppm. Preferably, the $H_2O_2$ level ranges from 10–30 ppm and the polyquat level ranges from 1–5 ppm. The solution is preferably applied at specified intervals (weekly, bi-weekly or monthly). At certain intervals (weekly, bi-weekly or monthly), superchlorination or superoxygenating shock treatment is applied prior to adding the $H_2O_2$ polyquat solutions. After several hours (if using unstabilized shock treatments), it is preferred to resume the treatment program with another $H_2O_2$ polyquat application.

Unstabilized chlorine products such as calcium hypochlorite, lithium hypochlorite are the preferred shocking agents because the resulting chlorine residuals will quickly be degraded by Ultraviolet radiation from the sun. Hence, although periodic superchlorination may be necessary for the system to maintain optimal performance, active chlorine will actually be present for relatively brief periods of time. The same would be true for activated sodium bromide. Bromine (as sodium bromide) can be activated by hypochlorous acid generated from bleach or dry oxidizers in water. Maintaining excellent water quality with such infrequent use of a halogen shock treatment is surprising.

Stabilized chlorinating agents using a cyanuric acid carrier (UV stabilizer) would be as effective as unstabilized chlorine, but oxidizing chlorine would remain active for longer periods of time. Residual levels of chlorine might cause irritation to swimmers or might degrade $H_2O_2$. Potassium monoperoxysulfate is a non-chlorine alternative for persons desiring to avoid the use of halogens.

Another aspect of the present invention uses dilute hydrogen peroxide as a sanitizer along with a polyquaternary ammonium stabilizer for treating regulated waters. The stabilizer allows $H_2O_2$ to remain biocidally active for longer periods of time and enhances its overall efficacy. The sanitizer and stabilizer can be added separately or blended together for a single, slug application. The ideal dose would comprise 1–2 gallons of the active ingredients (blended or separate) to maintain 20,000 gallons of regulated water every two weeks. The ability to effectively treat such a large volume of water without mechanical feeders and with such an infrequent dosing schedule is an unexpected advantage of the invention.

A variety of polyquaternary ammonium compounds may be used in the various aspects of the present invention, including poly(hexamethylammonium) chloride ("Q6/6"), poly[oxyethylene-(dimethylimino) ethylene-(dimethylimino) ethylene dichloride] ("PDED"), dodecamethylenedimethylimino chloride ("Q6/12") and 1,3-diazo-2,4-cyclopentadiene with 1-chloro-2,3-epoxypropane ("IPCP"). These and other polyquaternary ammonium compounds are available from common commercial sources.

Preferably the hydrogen peroxide and the polyquaternary ammonium compound are added independently so that appropriate concentrations of each composition may be maintained in the water. Appropriate concentrations are generally determined by testing the treated water. Then, the appropriate amount of either composition may be added. This technique provides the additional benefit of allowing the two components to be stored and handled separately.

In regular use, the water should contain between 5 and 40 ppm $H_2O_2$ and a polyquaternary ammonium stabilizer concentration between 1 and 20 ppm. In order to treat 20,000 gallons, a concentrated, blended product should contain between 10% and 80% $H_2O_2$ and 2% to 40% polyquat per one gallon container. When applied as separate products, the relative concentrations of $H_2O_2$ and polyquat should remain the same, using either gallon or half gallon containers.

As previously suggested, the various aspects of the present invention provide simple, albeit novel, improvements to the existing art. First, the invention precludes the need to purchase a mechanical device to apply the products. The cost of equipment and upkeep is thereby eliminated. Second, the invention is flexible in that the ingredients can be packaged as a shelf stable blend or in separate containers. Third, the schedule of product additions can be tailored to meet the needs of individual pool owners. For example, more or less stabilizer may be required in certain cases and can be added without adding unnecessary quantities of the other composition. Fourth, abandoning the mechanical device will make the technology more practical for consumers treating regulated waters. Fifth, this system melds the antimicrobial and aesthetic benefits of monomeric and polymeric quaternary ammonium compounds. That is, a biocidally efficacious system that produces only small amounts of foam, if any. Sixth, the invention is superior to the polybiguanide system in that the components can be blended in one container.

In one aspect of the invention the polyquaternary ammonium compounds act as flocculants. Flocculants are chemicals that are used to aggregate suspended solids from liquids, thereby facilitating their separation via precipitation or filtration. Consistent with this ability, polyquats are capable of cell adhesion and aggregation.

Studies performed in pools with swimmers have shown that polyquats such as Q6/6 are unable to sanitize water when used alone. In such cases bacterial densities were as high as $1 \times 10^5$ per milliliter. Despite high bacterial populations, water clarity remained excellent. Table 1 displays a brief excerpt from the in-use pool study.

TABLE 1

Bacterial Densities Versus Water Clarity.

| Q6/6 CONCENTRATION (PPM) | BACTERIAL DENSITY PER ML | TURBIDITY[1] (NTU) |
|---|---|---|
| 6 | 12,350 | 0.22 |
| 5 | 126,000 | 0.25 |
| 5 | 24,300 | 0.17 |
| 3 | 4,130 | 0.19 |
| 3 | 8,500 | 0.29 |

[1]NTU — Nephelometric Turbidity Units.

A priori, one might expect the relationship between turbidity and bacterial density to be directly proportional. However in the case where the bacterial population was as high as 126,000/ml water clarity remained excellent. A turbidity value below 0.32 NTU is considered clear. At 0.32 NTU or higher water is hazy or cloudy.

Based on literature and on our corroborating observations, it appears that the bacteria remained completely viable, but in tight aggregates. This would explain the excellent clarity and the high bacterial densities.

Significant non-lethal alterations of the bacterial membrane might occur during the adhesion/aggregation process. These modifications could conceivably make an oxidizer such as $H_2O_2$ more accessible to critical areas of the cell membrane. In essence, the polyquat acts as an adjuvant or potentiator for $H_2O_2$. As a result, the kinetics of bacterial kill would be improved as well as the overall efficiency. This would lead to significantly faster kill rates and a decrease in the amount of $H_2O_2$ needed to sanitize the water.

Reference will now be made to specific examples using the processes described above. It is to be understood that the examples are provided to more completely describe preferred embodiments, and that no limitation to the scope of the invention is intended thereby.

EXAMPLE 1

In order to test the ability of various polyquats to stabilize $H_2O_2$, five, 10 gallon aquariums were filled with water and adjusted to the following parameters: about 200 ppm calcium hardness, 120 ppm alkalinity and pH 7.4. Each aquarium was dosed with 10 ppm of a different polyquat consisting of Q6/6, PDED, Q6/12 or IPCP. Hydrogen peroxide was added (27.5 ppm) to the tanks containing the polyquats and to a control tank that contained no polyquat.

Each tank was challenged daily with 25 ml of bacterial suspension (about $10^8$ to $10^9$ organisms) containing P. aeruginosa, E. coli, and S. aureus. These are some of the major bacteria which can be recovered from recreational and industrial waters. Peroxide and polyquat concentrations were monitored after about 24 hours and recorded in Tables 2–6. Moreover, samples were removed 30 minutes after inoculation, treated with a neutralizer and plated onto nutrient agar to determined the number of viable bacteria.

TABLE 2

$H_2O_2$ as a Stand Alone Sanitizer.

| DAY | $H_2O_2$ PPM | TPC[1] |
|---|---|---|
| 1 | 34 | 20,350 |
| 2 | 11.9 | 692,000 |
| 3 | 4.25 | 752,000 |
| 4[2] | 1.7 | 1,776,000 |
| 5 | 20.4 | 91,000 |
| 6 | 7.65 | 2,080,000 |
| 7 | 1.7 | 2,248,000 |

[1]TPC — Total heterotrophic Plate Count (viable aerobic bacteria) expressed as colony forming units per ml.
[2]Hydrogen Peroxide (about 27.5 ppm) was added to each tank at the end of Day 4.

TABLE 3

Effect of PDED on $H_2O_2$ Stability and Efficacy.

| DAY | $H_2O_2$ PPM | TPC |
|---|---|---|
| 1 | 28.9 | 40 |
| 2 | 12.8 | 109 |
| 3 | 5.95 | 970 |
| 4 | 3.4 | 500 |
| 5 | 24.7 | 220 |
| 6 | 11.9 | 3,000 |
| 7 | 8.5 | 4,950 |

TABLE 4

Effect of IPCP on $H_2O_2$ Stability and Efficacy.

| DAY | $H_2O_2$ PPM | TPC |
|---|---|---|
| 1 | 32.3 | 0 |
| 2 | 13.6 | 0 |
| 3 | 6.8 | 0 |
| 4 | 2.6 | 1 |
| 5 | 24.7 | 2 |
| 6 | 17.85 | 3 |
| 7 | 7.65 | 38 |

TABLE 5

Effect of Q6/12 on $H_2O_2$ Stability and Efficacy.

| DAY | $H_2O_2$ PPM | TPC |
|---|---|---|
| 1 | 32.3 | 0 |
| 2 | 12.8 | 0 |
| 3 | 7.7 | 0 |
| 4 | 3.4 | 11 |
| 5 | 27.2 | 0 |
| 6 | 22.1 | 5 |
| 7 | 10.2 | 7 |

TABLE 6

Effect of Q6/6 on $H_2O_2$ Stability and Efficacy.

| DAY | $H_2O_2$ PPM | TPC |
|---|---|---|
| 1 | 31.5 | 3,040 |
| 2 | 12.8 | 475 |
| 3 | 6.0 | 1,070 |
| 4 | 2.6 | 11,750 |
| 5 | 19.6 | 23 |
| 6 | 16.2 | 2,000 |
| 7 | 6.8 | 4,800 |

The data presented in Tables 2–6 strongly suggests that the class of molecules known as polyquaternary ammonium compounds has the ability to stabilize and increase the efficacy of hydrogen peroxidee. That is to say, $H_2O_2$ was more persistent in the presence of either of the polyquats (stability enhanced) and bacterial counts were greatly reduced (efficacy enhanced).

EXAMPLE 2

Since surprising trends were observed during the aquarium trials, further experiments were performed in outdoor pools. The efficacy of a combination of $H_2O_2$ with PDED and $H_2O_2$ alone was tested in 5,000 pools with Hayward S-166T sand filters. Using standard pool chemicals, each pool was adjusted to about 120 ppm alkalinity, 200 ppm calcium hardness and pH 7.4. In addition to receiving microbial inoculations from the environment, each pool was treated with bacterial suspensions (about $10^{10}$ to $10^{11}$ organisms) containing P. aeruginosa, E. coli, and S. aureus. Unlike the aquarium studies, the pools were subject to UV radiation from the sun.

Tables 7 and 8 summarize the results. Table 7 demonstrates the inability of $H_2O_2$ to control bacterial growth, even at high concentrations. In addition, previous research has demonstrated that PDED like $H_2O_2$, is not an effective sanitizer when used alone (data not shown). By contrast, Table 8 demonstrates the ability of polyquats to enhance $H_2O_2$, rendering it more efficacious. While PDED has demonstrated antimicrobial synergy with oxidizers, these data indicate that polyquats can also stabilize and extend peroxide half life in the use dilutions.

TABLE 7

$H_2O_2$ as a Stand Alone Sanitizer.

| DAY | $H_2O_2$ | PDED PM | CFU/ML |
|---|---|---|---|
| 1 | 26.35 | — | — |
| 2 | 23.8 | — | 330 |
| 3 | 23.0 | — | 900 |
| 4 | 17.0 | — | 4,900 |
| 7 | 5.1 | — | 51,000 |
| 8 | 0 | — | 47,000 |

TABLE 8

Stabilization of $H_2O_2$ with PDED.

| DAY | $H_2O_2$ | PDED PM | CFU/ML |
|---|---|---|---|
| 1 | 26.35 | 10 | 0 |
| 2 | 24.65 | 10 | 0 |
| 3 | 23.8 | 10 | 3 |
| 4 | 18.7 | 7 | 0 |
| 7 | 11.9 | 4 | 445 |
| 8 | 10.2 | 3 | 205 |

Figure 1:
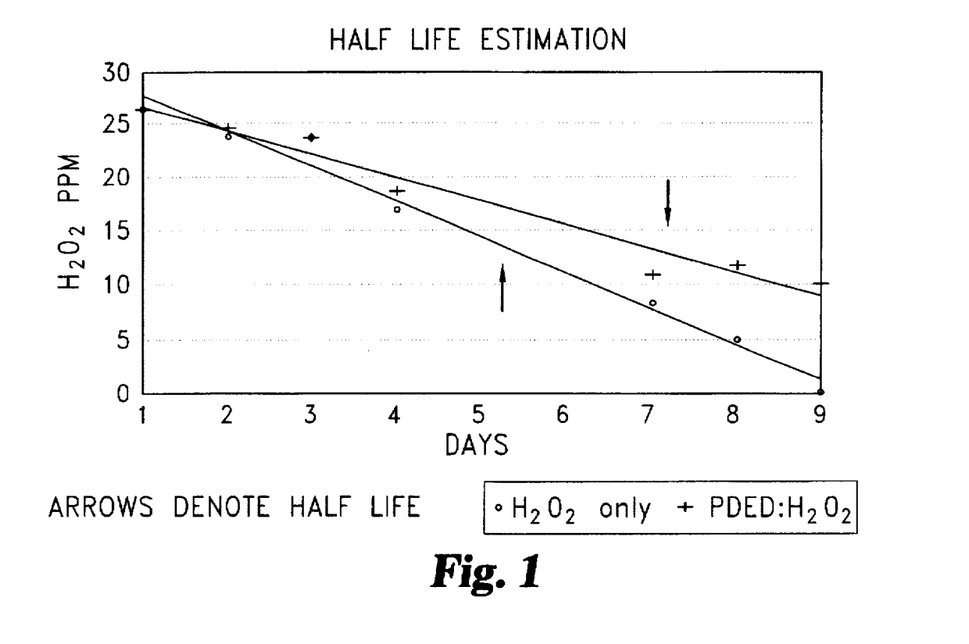
FIG. 1 is a graph of the half-life estimations of $H_2O_2$ with and without PDED.

The data in Tables 7 and 8 were graphed to show the trends of $H_2O_2$ disappearance (FIG. 1). In addition, the data were subjected to linear regression analysis. Table 9 was prepared using the statistics generated during linear regression and shows that PDED was able to extend the half life of $H_2O_2$, even then the PDED concentration was as low as 3 ppm. Using the data, we can extrapolate that $H_2O_2$ alone would last approximately 10.7 days, but would last 14.2 when stabilized with PDED.

TABLE 9

Half Life of $H_2O_2$ with and without PDED.

| STATISTICS | $H_2O_2$ | $H_2O_2$ + PDED |
|---|---|---|
| Y-INTERCEPT | 31.04 | 28.7 |
| SLOPE | -3.34 | -2.19 |
| $R^2$ | 0.978 | 0.961 |
| $H_2O_2$ HALF LIFE (DAYS) | 5.35 | 7.1 |

EXAMPLE 3

The experiment summarized in Example 3 is identical to Example 2, except that Q6/6 was substituted for PDED (Tables 10 and 11). Q6/6 alone is not an effective sanitizer in regulated waters (data not shown). As was the case with PDED, Q6/6 stabilized and enhanced the efficacy of $H_2O_2$. Hydrogen peroxide alone had a shorter half life and was not an effective bactericide even at the highest levels tested.

Figure 2:
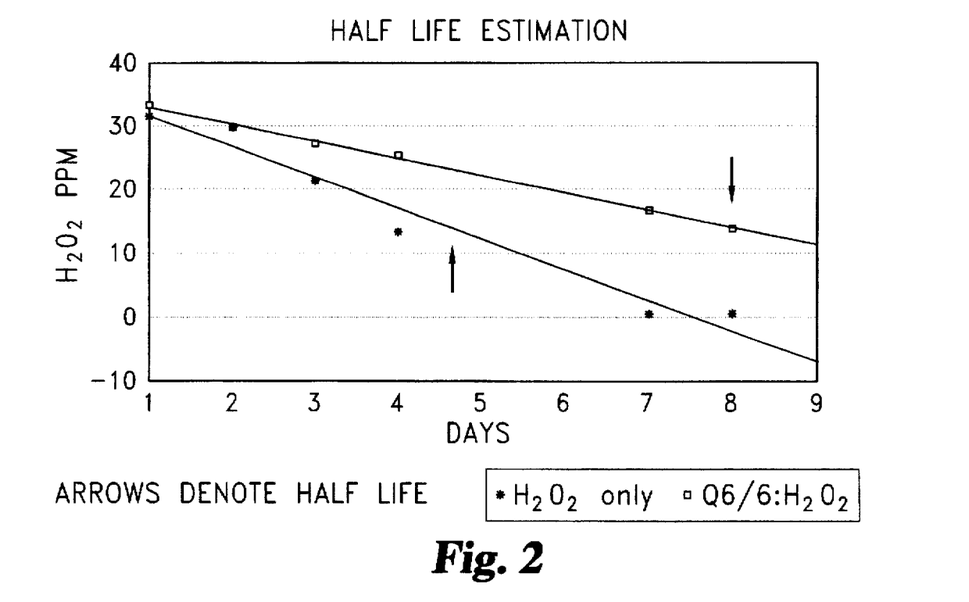
FIG. 2 is a graph of the half-life estimations of $H_2O_2$ with and without Q6/6.

Linear regression is compiled in Table 12. FIG. 2 graphically shows the difference in half life. Based on the regression, we can extrapolate that $H_2O_2$ alone would have lasted for about 9 days, but would have lasted for almost 16 days when stabilized with Q6/6.

TABLE 10

$H_2O_2$ as a Stand Alone Sanitizer.

| DAY | $H_2O_2$ PPM | Q6/6 PPM | CFU/ML |
|---|---|---|---|
| 1 | 31.5 | — | 555 |
| 2 | 29.8 | — | 19,350 |
| 3 | 21.3 | — | 36,100 |
| 4 | 13.6 | — | — |
| 7 | 0.7 | — | — |
| 8 | 0.7 | — | 1,950 |

TABLE 11

Stabilization of $H_2O_2$ with Q6/6.

| DAY | $H_2O_2$ PPM | Q6/6 PPM | CFU/ML |
|---|---|---|---|
| 1 | 33.15 | 7 | 1 |
| 2 | 29.8 | 4 | 9 |
| 3 | 27.2 | 4 | 38 |
| 4 | 25.5 | 2 | — |
| 5 | 17 | 1 | — |
| 6 | 14 | 1 | 46 |

TABLE 12

Half Life of $H_2O_2$ with and without PDED.

| STATISTICS | $H_2O_2$ | $H_2O_2$ + PDED |
|---|---|---|
| Y-INTERCEPT | 33.58 | 34.7 |
| SLOPE | -3.95 | -2.3 |
| $R^2$ | 0.96 | 0.99 |
| $H_2O_2$ HALF LIFE (DAYS) | 4.52 | 7.9 |

The data clearly show that a water treatment system based solely on $H_2O_2$ and a polyquaternary ammonium compound can achieve and maintain acceptable water quality. The fact that one gallon of blended material might be used to treat up to 20,000 gallons for up to two weeks constitutes a vast improvement over the existing polybiguanide technology. Recreational waters sanitized with biguanide usually require the staggered addition of three distinct products: Biguanide, hydrogen peroxide and ancillary algicides. Biguanide is usually added every 10 to 14 days, peroxide is added about every 20 to 30 days and algicides are added weekly or as needed. The present method greatly simplifies the biguanide art in that the products are added at the same time and may be combined into one bottle. In essence, product application is synchronized and one (blended) or two (separate) products are used instead of three.

Furthermore, since the method disclosed precludes the use of mechanized feeders, it offers tenable benefits for individuals involved in treating regulated waters. This method allows for a substantial cost savings, the elimination of feeder problems and maintenance and improved efficacy due to the inherent flexibility of applying bottled products.

EXAMPLE 4

Table 13 shows the surprising effect that a chlorine shock has on peroxide half life. A 5,000 gallon above ground pool was maintained on 10 ppm $H_2O_2$ and 5 ppm of a polyquat (Q6/12) weekly. The pool was challenged daily with an artificial insult containing synthetic sweat and a bacterial inoculum consisting of P. aeruginosa ($10^{9-10}$ cells). In addition, the pool received natural inoculations from the environment. In some cases, $H_2O_2$ was not measured due to intervening weekends.

As the data in Table 13 indicate, a chlorine shock allowed $H_2O_2$ to remain active in the pool for a longer period of time. Without a chlorine shock, $H_2O_2$ remained in the pools for only 3 days. Chlorine extended the presence of peroxide for an additional 2 days. Expressed differently, a single chlorine shock extended the life of $H_2O_2$ by 67%.

TABLE 13

Effect of Chlorine on $H_2O_2$ and Q6/12.

| DATE | $H_2O_2$ PPM | CHEMICALS ADDED |
|---|---|---|
| 10/18/94 | — | 10 PPM $H_2O_2$ |
| 10/19/94 | 8.5 | — |
| 10/20/94 | 5.1 | — |
| 10/21/94 | 0 | — |
| 10/26/94 | 0 | Calcium Hypochlorite |
| 10/27/94 | — | 10 PPM $H_2O_2$ |
| 10/28/94 | 7.7 | — |
| 10/29/94 | — | — |
| 10/30/94 | — | — |
| 10/31/94 | 3.4 | — |
| 11/01/94 | 0 | — |
| 11/16/94 | — | 10 PPM $H_2O_2$ |
| 11/17/94 | 6 | — |
| 11/18/94 | 0 | — |

EXAMPLE 5

In another experiment, a 5,000 gallon, above ground pool was treated with 27.5 ppm $H_2O_2$ and 10 ppm of a polyquat (Q6/6) on a weekly basis. Neither synthetic insult nor prepared bacterial inocula were added since human swimmers contributed natural flora and secretions whenever they were in the pool. These swimmers (4) averaged between 2-4 hr per person per week in this particular pool.

The data presented in Table 14 demonstrates the ability of a strong shock treatment to extend the life of $H_2O_2$. By using chlorine prior to adding peroxide, $H_2O_2$ remained at detectable levels for 6 days. Without chlorine, peroxide lasted only for a maximum of 4 days. In this case, chlorine increased the life of $H_2O_2$ by at least 33%. Moreover, $H_2O_2$ remained active for a longer period of time even though a larger amount of $H_2O_2$ was added during the subsequent addition (Table 14; 6/9-6/10). Similar results could be expected with strong oxidizers such as activated NaBr (or other forms of oxidizing bromine), leach, ozone, potassium peroxymonopersulfate, dichloroisocyanurates or trichloroisocyanurates.

TABLE 14

Effect of Chlorine on $H_2O_2$ and Q6/6.

| DATE | $H_2O_2$ PPM | CHEMICALS ADDED |
|---|---|---|
| 6/1/94 | — | Lithium Hypochlorite |
| 6/2/94 | 20 | 27.5 PPM $H_2O_2$ |
| 6/3/94 | — | — |
| 6/3/94 | — | — |
| 6/4/94 | — | — |
| 6/5/94 | — | — |
| 6/6/94 | 6 | — |
| 6/7/94 | 2 | — |
| 6/8/94 | 0 | — |
| 6/9/94 | 19 | 27.5 PPM $H_2O_2$ |
| 6/10/94 | 16 | 10 PPM $H_2O_2$ |
| 6/11/94 | — | — |
| 6/12/94 | — | — |
| 6/13/94 | 0 | — |

The data in Tables 13 and 14 clearly demonstrate the surprising benefits of shock chlorination on hydrogen peroxide half life. Example 6, including Table 15, corroborates and expands further on these findings.

EXAMPLE 6

A 23,000 gallon in-ground, gunite pool was treated with weekly applications of $H_2O_2$ (30%) containing Q6/6 (0.5%) and PDED (1.5%). The maintenance application rate was 1.5 gallons per week and delivered 22.5 ppm $H_2O_2$ and 2.25 ppm polyquat. In addition, 3 slow dissolving chlorine sticks were added every two weeks. At no time was a free chlorine residual observed using the slow dissolving chlorine sticks. As a comparison, typical chlorine sticks are used at a rate of 1 per 10,000 gallons and a free chlorine residual of 1-3 ppm should be maintained at all times. Moreover, these sticks may completely dissolve within three to five days.

Table 15 shows the beneficial effects of shock chlorination upon this system. At the beginning of this trial, $H_2O_2$ applications resulted in theoretical (or near theoretical) levels of $H_2O_2$ in the pool (6/28-7/9). As the trial progressed, subsequent $H_2O_2$ applications were substantially less productive (7/9-7/13). In order to restore $H_2O_2$ half life to its original length, 6 gallons of $H_2O_2$ were needed within a four day period even though the maintenance application rate was only 1.5 gallons per seven days.

TABLE 15

Effect of Chlorine on $H_2O_2$, Q6/6 and PDED

| DATE | $H_2O_2$ PPM | CHEMICALS ADDED |
|---|---|---|
| 6/28 | 0 | 30 PPM $H_2O_2$ |
| 6/29 | 25 | |
| 6/30 | 20 | |
| 7/1 | | |
| 7/2 | 15 | |
| 7/3 | 5 | |
| 7/4 | 2 | 22.5 PPM $H_2O_2$ |
| 7/5 | 20 | |
| 7/6 | 10 | |
| 7/7 | 5 | |
| 7/8 | 2 | |
| 7/9 | 0 | 22.5 PPM $H_2O_2$ |
| 7/10 | 5 | |
| 7/11 | 2.5 | 30 PPM $H_2O_2$ |
| 7/12 | 10 | |
| 7/13 | 0 | 37.5 PPM $H_2O_2$ |
| 7/14 | 25 | |
| 7/27 | 0 | 22.5 PPM $H_2O_2$ |
| 7/28 | 15 | |
| 7/29 | 10 | |
| 7/30 | 5 | |
| 7/31 | 3 | |
| 8/1 | 2 | |
| 8/2 | 1 | |
| 8/3 | 0 | 22.5 PPM $H_2O_2$ |
| 8/4 | 10 | |
| 8/5 | 10 | |
| 8/6 | 5 | |
| 8/7 | 2 | |
| 8/8 | 1 | |
| 8/9 | 0 | Lithium Hypochlorite |
| 8/10 | 0 | |
| 8/11 | 0 | 22.5 PPM $H_2O_2$ |
| 8/12 | 15 | |
| 8/13 | 10 | |

As time elapsed, the $H_2O_2$ maintenance applications again failed to yield theoretical levels (7/2-8/9). Furthermore, the use of slow eroding chlorine sticks did not effectively prevent the conditions that were responsible for the decrease in the theoretical levels. However, the addition of 5 lbs. of lithium hypochlorite successfully allowed hydrogen peroxide applications to yield concentrations that approached their expected levels (8/9–8/13). At the time of $H_2O_2$ addition, the pool still contained 2 ppm of free chlorine (8/11). Free chlorine readily neutralizes $H_2O_2$ and was probably responsible for a lower than expected $H_2O_2$ concentration. Nonetheless, superchlorination increased the $H_2O_2$ level by 33% over the previous initial concentration (8/4 and 8/12).

It is to be appreciated that the methods described above are particularly applicable for use in treating swimming pool water, as shown in the foregoing examples. The methods may also be used, however, to treat spa water or other recirculating and/or recreational water systems, including treating cooling tower water, etc.

While the invention has been described in detail in the foregoing description, the same is to be considered as illustrative and not restrictive in character, it being understood that only the preferred embodiment has been shown and described and that all changes and modifications that come within the spirit of the invention are desired to be protected.

What is claimed is:

1. A method of treating water, comprising the steps of:
   (a) providing hydrogen peroxide and at least one polyquaternary ammonium compound to a recirculating water system; and
   (b) intermittently adding to said water system an oxidizing agent selected from the group consisting of chlorine-, bromine- or oxygen-releasing compounds.

2. The method of claim 1 wherein said hydrogen peroxide and said polyquaternary ammonium compound are provided by providing to the water a shelf-stable composition comprising hydrogen peroxide and at least one polyquaternary ammonium compound.

3. The method of claim 1 wherein said chlorine-, bromine- or oxygen-releasing compound is a member selected from the group consisting of calcium hypochlorite, lithium hypochlorite, activated sodium bromide, sodium dichloroisocyanurate, trichloroisocyanurate, sodium hypochlorite, potassium peroxymonopersulfate.

\* \* \* \* \*

UNITED STATES PATENT AND TRADEMARK OFFICE
CERTIFICATE OF CORRRECTION

PATENT NO. : 5,783,092                       Page 1 of 2
DATED : July 21, 1998
INVENTOR(S) : Geoffrey A. Brown, Mary L. Lines and James J. Miller It is certified that error appears in the above-identified patent and that said Letters Patent is hereby corrected as shown below:

On the title page item [56], insert following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 5 | 0 | 8 | 2 | 5 | 0 | 4/16/96 | Miller et al. | | | |
| | | 5 | 5 | 0 | 1 | 8 | 0 | 2 | 3/26/96 | Thorp et al. | | | |
| | | 5 | 3 | 0 | 6 | 4 | 3 | 2 | 4/26/94 | Puetz | | | |
| | | 5 | 2 | 5 | 6 | 4 | 2 | 0 | 10/26/93 | Tsao et al. | | | |
| | | 5 | 2 | 5 | 4 | 5 | 2 | 6 | 10/19/93 | Hamilton | | | |
| | | 5 | 1 | 4 | 2 | 0 | 0 | 2 | 8/25/92 | Metzner | | | |
| | | 5 | 3 | 3 | 2 | 5 | 1 | 1 | 7/26/94 | Gay et al. | | | |
| | | 4 | 5 | 3 | 4 | 9 | 4 | 5 | 8/13/85 | Hopkins et al. | | | |
| | | 4 | 9 | 8 | 1 | 6 | 6 | 2 | 1/1/91 | Dougherty | | | |

UNITED STATES PATENT AND TRADEMARK OFFICE
CERTIFICATE OF CORRECTION

PATENT NO. : 5,783,092
DATED : July 21, 1998
INVENTOR(S) : Geoffrey A. Brown, Mary L. Lines and James J. Miller It is certified that error appears in the above-identified patent and that said Letters Patent is hereby corrected as shown below:

In column 5, line 38, please change the word "determined" to --determine--.

In column 6, line 43, please change the word "peroxidee" to --peroxide--.

Signed and Sealed this

Thirtieth Day of March, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO : 5,783,092

DATED : July 21, 1998

INVENTOR(S) : Geoffrey A. Brown et al.

It is certified that errors appear in the above-identified patent and that said Letters Patent are hereby corrected as shown below:

In column 5, line 38, please change the word "determined" to --determine--.

In column 6, line 43, please change the word "peroxidee" to --peroxide--.

Signed and Sealed this

First Day of May, 2001

*Attest:*

NICHOLAS P. GODICI

*Attesting Officer*   Acting Director of the United States Patent and Trademark Office